Patented Jan. 17, 1939

2,144,166

UNITED STATES PATENT OFFICE 2,144,166

PAINT

Waldemar Roohadze, Chicago, Ill., assignor to Brown-Lindsay Paint Company, a corporation of Illinois No Drawing. Application June 22, 1936, Serial No. 86,697

3 Claims. (Cl. 134—39)

My invention relates to paint and more particularly to an odorless paint.

Paints consist of finely ground pigments, mixed with suitable vehicles and sufficient driers. The paint vehicles now known to the art comprise various oils such as linseed oil, soya bean oil, China-wood oil, Perilla oil, fish oil, corn oil, or pine oil, admixed with various proportions of solvents such as turpentine, benzine, benzol, toluol, and various fractions of petroleum and asphalt oils which have about the same specific gravity as turpentine. Pigments are various inorganic compounds such as white lead, lead sulphite, lead sulphate, zinc oxide, hydrated oxide of zinc, barium sulphate, titanium oxide, titanium dioxide, yellow lead oxide, red lead, blue lead, Venetian red (a ferric oxide containing gypsum), Indian red (native oxide of iron), quicksilver vermilion (amorphous mercury sulphide made with sulphur in the presence of an alkaline solution), permanent vermilion (orange mineral tinted with paranitraniline), helio fast red (nitro-para toluidine), lithol red, burnt sienna, burnt umber, burnt ochre, Prince's mineral brown, Van Dyke brown, ochre (hydrated oxide of iron), chrome yellow (lead chromate), zinc chromate, cadmium sulphides, cadmium selenides, ultra marine blue, cobalt blue, Prussian blue (ferri-ferro cyanide of iron), chrome green, chromium oxide, green aniline lakes, zinc green (chromate of zinc and Prussian blue), copper green (bicarbonate of copper), lamp black, carbon black, drop black, black toner, benzol black, acetylene black, mineral black, barium sulphate, barium carbonate, infusorial earth, asbestos, calcium carbonate, gypsum (calcium sulphate).

In compounding paints, suitable quantities of pigments are mixed with a suitable vehicle, together with driers. It is assumed that driers exert no chemical action but attract oxygen from the air by virtue of their presence, acting in the nature of catalytic agents. The principal driers used in paint are metallic soaps usually composed of lead and manganese in the form of linoleates or resinates. Too much drier is harmful, but a limited amount serves the purpose of permitting the paint to dry before dust can collect. Lakes are dyes precipitated on a transparent base and are, of themselves, more or less transparent or translucent. There are two kinds of lakes, those made from aniline dyes and those made from wood dyes. Enamels formerly embraced that class of paints composed of pigments ground in varnish, which dried with a high gloss.

The disagreeable odors of paints are caused principally by the solvents. The vapors of the solvents used in paint, besides being disagreeable in odor, frequently are toxic to human beings. Then, too, certain foods such as butter, have the property of absorbing the vapors. In hospitals, the wards and rooms must be cleared for painting as the odor of drying paint has been known to work injury to patients.

One object of my invention is to provide an odorless paint which can be used in food stores, hospitals, restaurants, dairies, and hotels.

In general, my invention contemplates the use of a deodorized solvent, namely a hydrocarbon of the kerosene boiling range or lower, which has been deodoroized by the action of fuming sulphuric acid, followed by filtration through suitable mediums, as for example activated clays, diatomaceous earths, or activated carbons.

More particularly, in order that my invention may be more fully understood, I give the following example of a paint made in accordance with my invention, it being remembered that the example is by way of illustration only and not by way of limitation. In the following formula, the percentages are given by weight:

Percent pigment_____ 35.60
Percent gums_____ 18.44
Percent odorless solvent_____ 23.97
Percent drying oils_____ 18.44
Percent driers_____ 3.55

In the above formula, any suitable pigment may be used. For example, if a white enamel is to be made, I may use 30.99 per cent of titanium oxide with 4.61 percent of zinc oxide. The gums may be of any suitable type, as for example Damar gum, Congo gum, Manilla gum or other fossil gums, or any of the synthetic gums such as phenol condensation products, esterized resins, chlorinated rubber gums. Inasmuch as the above formula is for an enamel, the gums are added to give the gloss and to serve the further purpose of acting as protective colloids, serving to keep the pigments in suspension.

The drying oils listed above may be any of the known drying oils such as kettled linseed oil, rape seed oil, hemp seed oil, soya bean oil, or tung oil.

The driers may be of any suitable type. I may use, for example, a mixture of lead naphthenate, zinc naphthenate and cobalt naphthenate, in the following proportions:

Percent lead naphthenate_____ 1.55
Percent zinc naphthenate_____ 1.55
Percent of cobalt naphthenate_____ .45

The lead naphthenate appears to act as a "bottom drier", that is, it tends to cause polymerization of the film from that portion adjacent the surface upon which the paint is applied. The cobalt naphthenate acts as a surface drier and tends to cause catalytic oxidation or polymerization of the surface of the gums, while the zinc naphthenate keeps the film open or spongy and prevents wrinkled areas. Iron naphthenate driers may be used in the darker colored paints. The solvent used above is the important part of my invention and, as pointed out hereinbefore, comprises a hydrocarbon oil of about the boiling range of kerosene, which has been deodorized by contacting it with fuming sulphuric acid and filtering it through activated filtering mediums. The solvent is not quite as volatile as some of the other solvents used, but I have been able to compound a paint which will dry nicely within eight to fourteen hours.

If a flatter paint is desired, a larger percentage of pigment and of solvent is employed with a smaller percentage of gums which, as pointed out above, impart the gloss to the paint, characterizing it as "an enamel".

It will be observed that I have accomplished the objects of my invention. I have produced a paint which is substantially odorless and which can be used, without disadvantage, in food stores, restaurants, dairies, hospitals, and the like, and in homes where the odor of paint is objectionable. The hydrocarbon solvent thus treated appears to be non-toxic and no ill effects are had from the presence of the hydrocarbon vapors which result by evaporation when the paint is drying.

It will be understood that certain features and subcombinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A paint consisting of a pigment, gums, driers, and a deodorized hydrocarbon solvent.

2. In a paint, a solvent consisting of deodorized hydrocarbon solvent boiling within the kerosene boiling range.

3. A paint having substantially the following formula by weight:

|  | Percent |
|---|---|
| Pigment | 35.60 |
| Gums | 18.44 |
| Deodorized hydrocarbon solvent | 23.97 |
| Drying oils | 18.44 |
| Metallic naphthenate driers | 3.55 |

WALDEMAR ROOHADZE.